(12) United States Patent
Takamiya et al.

(10) Patent No.: US 7,953,529 B2
(45) Date of Patent: May 31, 2011

(54) DETERMINATION OF ABNORMALITY OF AN INTAKE AIR SYSTEM OF AN INTERNAL-COMBUSTION ENGINE

(75) Inventors: Hideharu Takamiya, Saitama (JP); Isao Komoriya, Saitama (JP); Hiroyuki Ando, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 532 days.

(21) Appl. No.: 12/007,962

(22) Filed: Jan. 17, 2008

(65) Prior Publication Data

US 2008/0189007 A1    Aug. 7, 2008

(30) Foreign Application Priority Data

Jan. 18, 2007    (JP) .................................. 2007-009445

(51) Int. Cl.
     *G01M 17/00*    (2006.01)
(52) U.S. Cl. ............. 701/29; 701/54; 701/103; 701/123
(58) Field of Classification Search .................... 701/29, 701/54, 103, 104, 109, 123; 60/277; 123/672
See application file for complete search history.

(56) References Cited

U.S. PATENT DOCUMENTS

2004/0148926 A1*   8/2004   Morinaga et al. ............... 60/277
2007/0125347 A1*   6/2007   Nakagawa et al. ........... 123/672

FOREIGN PATENT DOCUMENTS

| JP | 2000-227033 | 8/2000 |
|---|---|---|
| JP | 2003-148215 | 5/2003 |
| JP | 2004-036560 | 2/2004 |
| JP | 2004-116399 | 4/2004 |

* cited by examiner

*Primary Examiner* — Gertrude Arthur Jeanglaud

(74) *Attorney, Agent, or Firm* — Squire, Sanders & Dempsey (US) LLP

(57) ABSTRACT

The present invention provides a scheme for determining an abnormality of an intake air system with higher accuracy in an engine an intake air amount is controlled by adjusting a lift amount of an intake valve. A throttle opening area is determined based on a current intake air amount. A feedback correction is performed on the throttle opening area. The feedback correction includes determining a correction amount of the throttle opening area such that the gauge pressure inside the intake manifold converges to a desired gauge pressure and then adding the correction amount to the throttle opening area. A feedback control is performed on an air-fuel ratio. The feedback control includes determining a correction amount of the air-fuel ratio based on a detection value of an air-fuel ratio detecting means provided in an exhaust manifold. An abnormality of the intake air system is determined during an idling operation based on the correction amount of the throttle opening area and the correction amount of the air-fuel ratio.

12 Claims, 7 Drawing Sheets

DETERMINATION OF ABNORMALITY OF AN INTAKE AIR SYSTEM OF AN INTERNAL-COMBUSTION ENGINE

BACKGROUND OF THE INVENTION

The present invention relates to an abnormality determination for an intake air system of an internal-combustion engine (which will be hereinafter referred to as an "engine").

Conventionally, a scheme for detecting a secondary air leak in an intake air system of an engine has been proposed. For example, Japanese Patent Application Publication No. 2003-148215 discloses controlling an intake air amount in an engine by adjusting an opening degree of a throttle valve. Occurrence of secondary air is determined based on the magnitude of a control correction term for the opening degree of the throttle valve. On the other hand, failure detection for a throttle valve mechanism and/or a sensor for measuring a pressure inside an intake manifold of an engine is conventionally implemented by detecting a broken wire, a short circuit and so on.

In an engine where an intake air amount is controlled by a variable valve actuation mechanism that changes a lift amount of an intake valve, the conventional secondary air leak detection scheme cannot be implemented. Further, it is difficult for the conventional failure detection scheme for a throttle valve mechanism and a sensor for measuring a pressure inside an intake manifold to detect a characteristic abnormality such as a deviation of a sensor measurement value from its initial state.

In order to solve these problems, the present invention aims at providing a scheme for determining an abnormality of an intake air system with higher accuracy in an engine where an intake air amount is controlled by adjusting a lift amount of an intake valve.

SUMMARY OF THE INVENTION

According to one aspect of the present invention, a scheme for determining an abnormality of an intake system in an engine is provided. The engine has a variable valve actuation mechanism for continuously adjusting at least a lift amount of an intake valve to control an intake air amount and a throttle valve for keeping a gauge pressure inside an intake manifold at a predetermined desired gauge pressure. A throttle opening area is determined based on a current intake air amount. A feedback correction is performed on the throttle opening area. The feedback control includes determining a correction amount of the throttle opening area such that the gauge pressure inside the intake manifold converges to the desired gauge pressure and then adding the correction amount to the throttle opening area. A feedback control is performed on an air-fuel ratio. The feedback control includes determining a correction amount of the air-fuel ratio based on a detection value of an air-fuel ratio detecting means provided in an exhaust manifold. An abnormality of the intake air system is determined during an idling operation based on the correction amount of the throttle opening area and the correction amount of the air-fuel ratio. Thus, an abnormality of the intake air system can be determined with higher accuracy.

According to one embodiment of the present invention, it is determined that there is an abnormality in the throttle valve when the correction amount of the throttle opening area is greater than a first determination value and the correction amount of the air-fuel ratio is equal to or less than a second determination value.

According to another embodiment of the present invention, it is determined that there is an abnormality in a measuring means for measuring a pressure inside the intake manifold when the correction amount of the throttle opening area is greater than the first determination value and the correction amount of the air-fuel ratio is greater than the second determination value.

According to one embodiment of the present invention, it is determined that an secondary air occurs when the following conditions are met: 1) the correction amount of the throttle opening area is equal to or less than the first determination value; 2) the correction amount of the air-fuel ratio is equal to or less than the second determination value; and 3) an error between an estimated intake air amount and an actual intake air amount is greater than a third determination value. The estimated intake air amount is derived from an engine rotational speed, an intake manifold pressure and the lift amount. The actual intake air amount is detected by an intake air amount detecting means.

DESCRIPTION OF THE PREFERRED EMBODIMENTS

Figure 1:
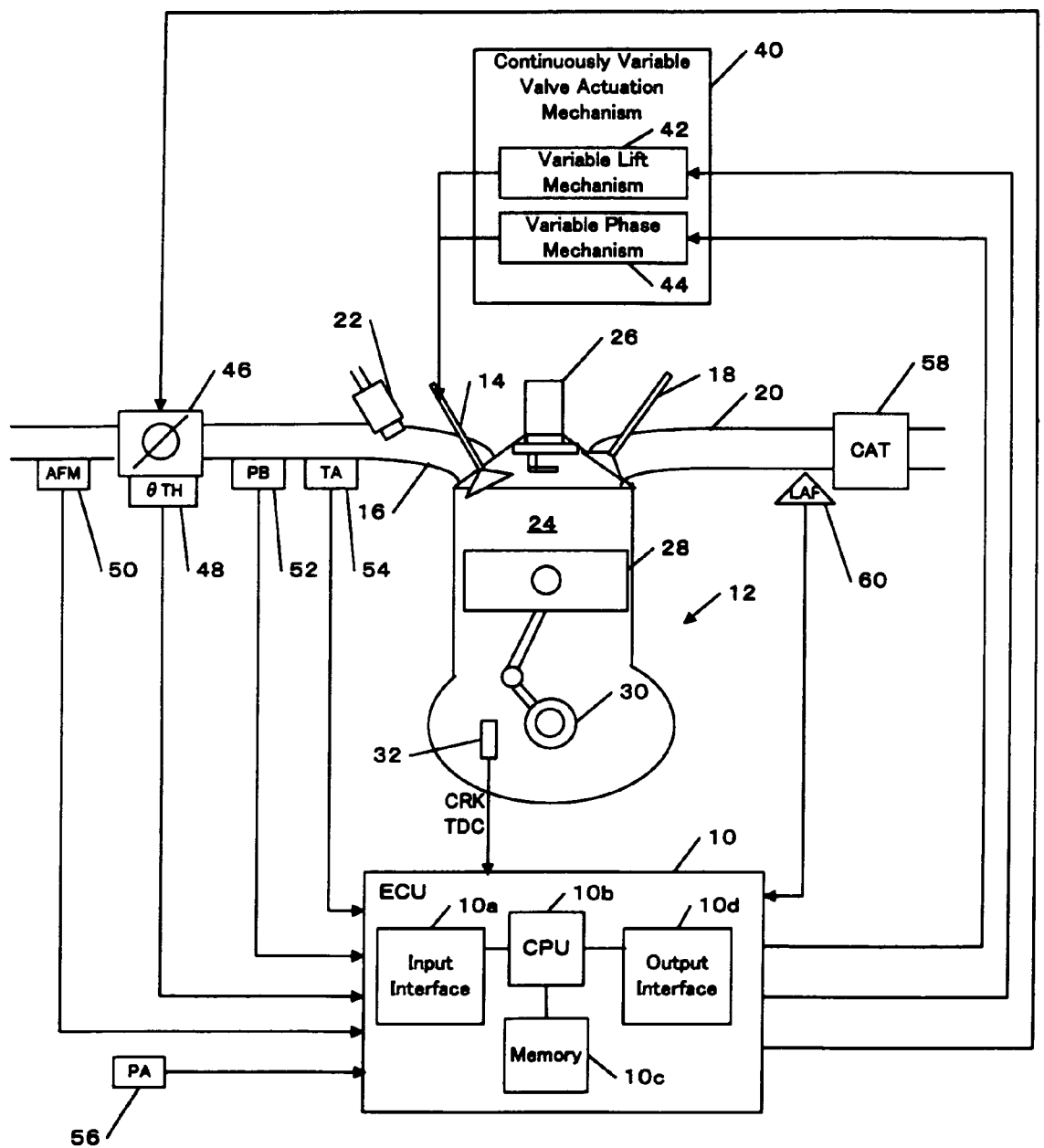
FIG. 1 is a block diagram of an overall system structure of an engine and its control unit in accordance with one embodiment of the present invention.

Preferred embodiments of the present invention will be described referring to the attached drawings. FIG. 1 is an overall system structure of an engine and its control unit in accordance with one embodiment of the present invention.

An electronic control unit (hereinafter referred to as an "ECU") 10 is a computer having an input interface 10$a$ for receiving data sent from each part of a vehicle, a CPU 10$b$ for carrying out operations for controlling each part of the vehicle, a memory 10$c$ including a read only memory (ROM) and a random access memory (RAM) that temporarily stores data, and an output interface 10$d$ for sending a control signal to each part of the vehicle. Various programs and data for controlling each part of the vehicle are stored in the ROM.

One or more programs for implementing a constant negative pressure control and determining an abnormality of an intake air system, and data and one or more tables used in performing the programs, according to one embodiment of the invention, are stored in the ROM. The ROM may be a rewritable ROM such as an EEPROM. The RAM provides work areas for operations by the CPU 10b, in which data sent from each part of the vehicle as well as a control signal to be sent out to each part of the vehicle are temporarily stored.

Signals sent to the ECU 10 are passed to the input interface 10a. The input interface 10a converts analog signal values into digital signal values. The CPU 10b processes the resulting digital signals, performs operations in accordance with one or more programs stored in the memory 10c, and creates control signals. The output interface 10d sends these control signals to each part of the vehicle.

An engine 12 is, for example, a 4-cycle engine equipped with four cylinders. One of the cylinders is schematically illustrated in FIG. 1. The engine 12 is connected to an intake manifold 16 through an intake valve 14 and connected to an exhaust manifold 20 through an exhaust valve 18. A fuel injection valve 22 for injecting fuel in accordance with a control signal from the ECU 10 is provided in the intake manifold 16. Alternatively, the fuel injection valve 22 may be provided in a combustion chamber 24.

The engine 12 introduces an air-fuel mixture of the air taken from the intake manifold 16 and the fuel injected from the fuel injection valve 22 into the combustion chamber 24. A spark plug 26 is provided in the combustion chamber 24 to ignite the spark in accordance with an ignition timing signal from the ECU 10. The air-fuel mixture combusts in response to the spark ignited by the spark plug 26. The combustion increases the volume of the air-fuel mixture. A piston 28 is pushed downward. A reciprocal motion of the piston 28 is converted into a rotational motion of a crank shaft 30. In the case of a 4-cycle engine, a cycle of the engine includes four strokes of intake, compression, combustion and exhaust. The piston 28 travels up and down four times in one cycle.

A crank angle sensor 32 for detecting a rotation angle of the crank shaft 30 is provided in the engine 12. The crank angle sensor 32 outputs a CRK signal and a TDC signal, which are pulse signals, to the ECU 10 in accordance with the rotation of the crankshaft 30.

The CRK signal is a pulse signal that is output at a predetermined crank angle (e.g., at every 30 degrees). The TDC signal is a pulse signal that is output at a crank angle (e.g., at every 180 degrees) associated with a TDC (top dead center) position of the piston 28. These pulse signals are used in various timing controls such as fuel injection timing, ignition timing or the like for operating the engine.

A continuously variable valve actuation mechanism 40 is a mechanism capable of continuously changing a lift amount and an opening/closing timing (phase) of the intake valve 14. In this embodiment, the continuously variable valve actuation mechanism 40 includes a variable lift mechanism 42 and a variable phase mechanism 44.

The variable lift mechanism 42 is a mechanism capable of continuously changing the lift amount of the intake valve 14 in accordance with a control signal from the ECU 10. The variable lift mechanism can be implemented by any known technique. For example, a mechanism implemented with a cam, lift variable link, upper link, and lower link has been proposed in Japanese Patent Application Publication No. 2004-036560. In the mechanism, the angle of the lower link is changed by, for example, an actuator to control a maximum lift amount of the valve.

The variable phase mechanism 44 is a mechanism capable of continuously changing the opening/closing timing (phase) of the intake valve 14 in accordance with a control signal from the ECU 10. The variable phase mechanism can be implemented by any known technique. For example, a mechanism for electromagnetically advancing and retarding the phase of the intake valve has been proposed in Japanese Patent Application Publication No. 2000-227033.

Alternatively, the variable lift mechanism 42 and the variable phase mechanism 44 may be integrated into a single unit.

In this embodiment, the continuously variable valve actuation mechanism 40 is utilized for controlling the amount of intake air introduced into the engine 12. The intake air amount can be controlled by changing the lift amount of the intake valve 14 via the continuously variable valve actuation mechanism 40.

A throttle valve 46 is provided in the intake manifold 16. The throttle valve 46 is a drive-by-wire (DBW) throttle valve that is driven by an actuator (not illustrated in the drawings) in accordance with a control signal from the ECU 10.

A throttle valve opening sensor 48, which is attached to the throttle valve 46, provides the ECU 10 with a signal corresponding to an opening degree θTH of the throttle valve.

In this embodiment, the throttle valve 46 is used in a constant negative pressure control for keeping a negative pressure inside the intake manifold constant at a desired value. The constant negative pressure control can be implemented by changing the opening degree of the throttle valve 46 to adjust the negative pressure (gauge pressure) inside the intake manifold.

An air flow meter 50 is provided upstream of the throttle valve 46 of the intake manifold 16. The air flow meter 50 outputs to the ECU 10 an electric signal indicating the amount of intake air GAIR.

An intake manifold pressure sensor 52 and an intake air temperature sensor 54 are provided downstream of the throttle valve 46 of the intake manifold 16 to output to the ECU 10 electric signals indicating an absolute pressure Pb inside the intake manifold and a temperature Ta of intake air, respectively.

An atmospheric pressure sensor 56 is provided at an appropriate position outside the engine to output to the ECU 10 an electric signal indicating an atmospheric pressure Pa.

A LAF (linear air-fuel) sensor 60 is provided upstream of a catalyst 58 of the exhaust manifold 20. The LAF sensor 60 outputs to the ECU 10 a signal that is proportional to the concentration of oxygen included in the exhaust gas over a wide range from lean to rich.

Figure 2:
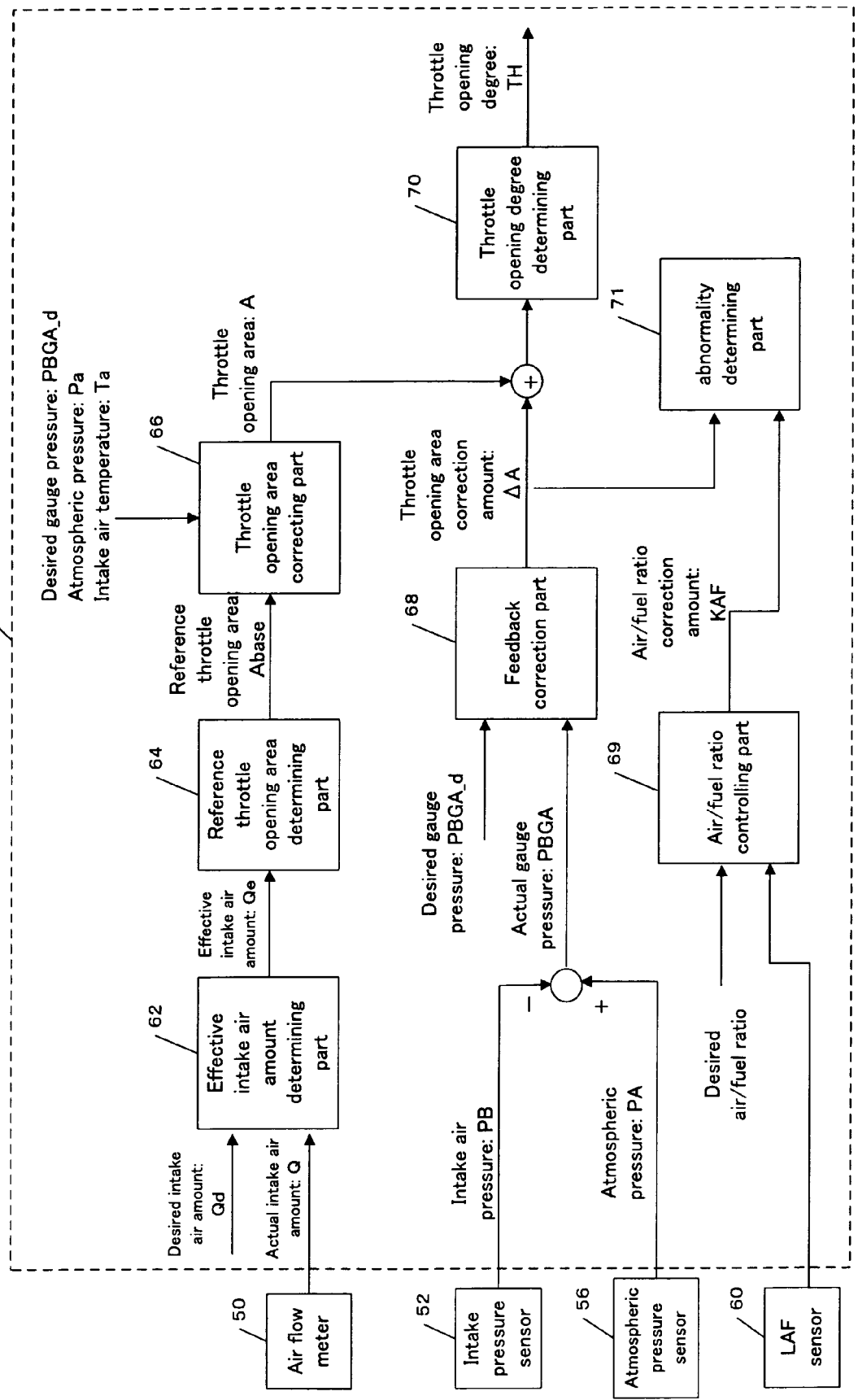
FIG. 2 is a functional block diagram of an intake air controlling apparatus for a constant negative pressure control in accordance with one embodiment of the present invention.

Referring to FIG. 2, an intake air controlling apparatus of the engine in accordance with one embodiment of the present invention will be described.

As described above, the intake air controlling apparatus controls the amount of the intake air by adjusting the lift amount of the intake valve 14 via the variable valve actuation mechanism 40. The intake air controlling apparatus also performs the constant negative pressure control for keeping the gauge pressure (negative pressure) in the intake manifold 16 at a desired gauge pressure independently of an increase/decrease of the intake air amount. In one embodiment, each function of the intake air controlling apparatus is implemented in the ECU 10. The CPU 10b of the ECU 10 performs one or more programs stored in the memory 10c of the ECU 10 to implement the functions.

FIG. 2 shows a detail of functions for the constant negative pressure control in the intake air controlling apparatus. In brief, the constant negative pressure control is formed by two sections. One section includes an effective intake air amount determining part 62, a reference throttle opening area determining part 64 and a throttle opening area correcting part 66 and acts to perform a feed-forward control for estimating, based on a current intake air amount, an opening area of the throttle valve 46 for achieving a desired gauge pressure under the current atmospheric pressure and the current intake air temperature. The other section includes a feedback correction part 68 and acts to perform a feedback control for determining a correction amount of the throttle opening area such that the current gauge pressure inside the intake manifold is kept at the desired gauge pressure.

At first, the section acting to perform the feed-forward control, which is illustrated in the upper portion of FIG. 2, will be described. The effective intake air amount determining part 62 determines an effective intake air amount Qe based on the actual intake air amount Q detected by the air flow meter and the desired intake air amount Qd, by using a recursive least square filter, as follows.

$$Qe = \theta(\text{current value}) + Qd \quad (1)$$

Here, θ indicates a model parameter and represented by the following equation.

$$\theta(\text{current value}) = \theta(\text{previous value}) + P \cdot e \quad (2)$$

Here, P indicates an identification gain, which is, for example, 0.01. An identification error "e" is represented by the following equation.

$$e = Q \cdot (\theta(\text{previous value}) + Qd) \quad (3)$$

The effective intake air amount Qe thus calculated has advantages of both of controlling the throttle opening degree based on the actual intake air Q and controlling the throttle opening degree based on the desired intake air Qd. Because the actual intake air amount Q is detected by the air flow meter 50 provided upstream of the throttle 46, the throttle opening degree can be accurately estimated without being influenced by the secondary air. However, there is a disadvantage that the estimated opening degree may be unstable because the value of the actual intake air amount GAIR varies in accordance with variations of the throttle valve.

On the other hand, the desired intake air amount Qd is not influenced by variations of the throttle valve because the actual throttle opening degree is not used as a parameter for determining the desired intake air amount. However, there is a disadvantage that the estimation accuracy of the throttle opening degree may be degraded because the accurate amount of air flowing through the throttle valve is unknown when the secondary air is introduced.

By controlling the throttle opening degree based on the effective intake air amount Qe, both of the advantage that the accuracy of the throttle control is maintained when the secondary air is introduced and the advantage that the interference with the throttle valve is prevented can be simultaneously achieved.

The reference throttle opening area determining part 64 refers to a correlation table based on the effective intake air amount Qe to determine a reference throttle opening area Abase. The table defines a relation between the throttle opening area and the intake air amount under a predetermined reference condition of a reference gauge pressure, a reference atmospheric pressure and a reference intake air temperature. The reference throttle opening area Abase indicates a throttle opening area under the reference condition.

Figure 3:
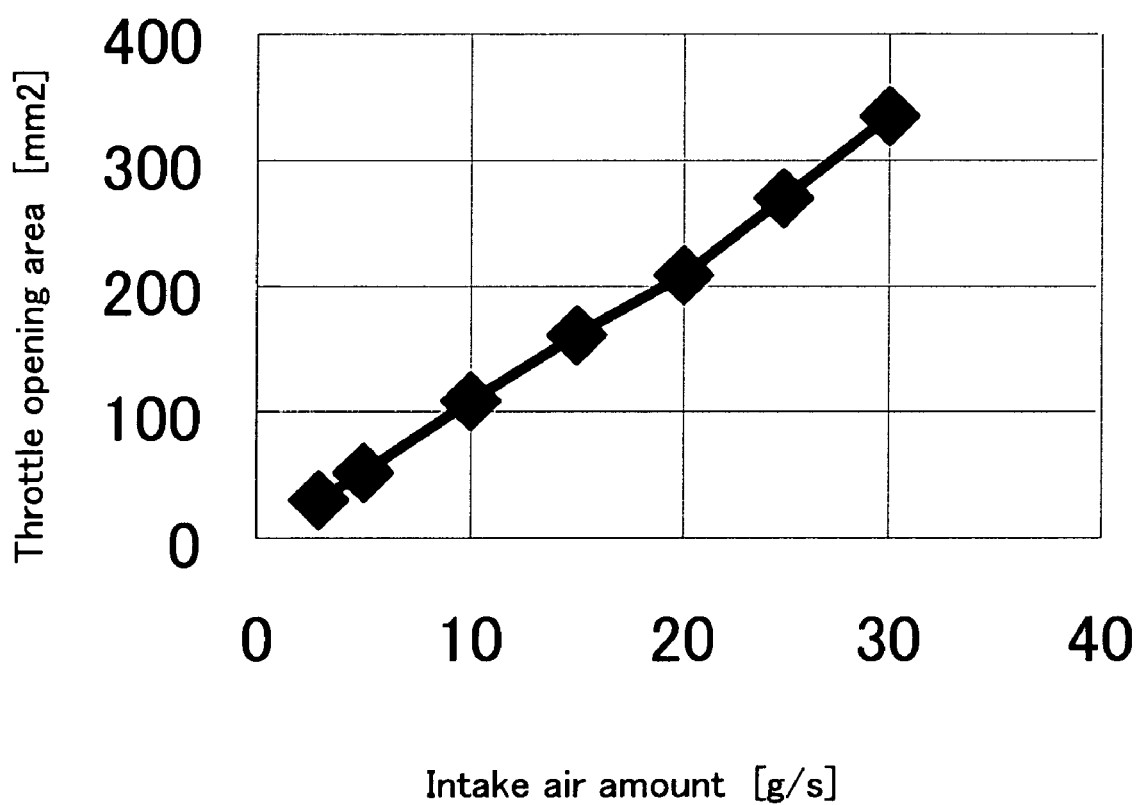
FIG. 3 shows a correlation table defining a relation between an effective intake air amount and a throttle opening area under a reference environment in accordance with one embodiment of the present invention.

FIG. 3 shows an example of the correlation table. This example shows a relation between the throttle opening area and the effective intake air amount under the reference condition where the gauge pressure is 50 mmhg, the atmospheric pressure is 1 atmosphere (that is, 760 mmHg) and the intake air temperature is 25 degrees (° C.). This correlation table may be stored in the memory 10c of the ECU 10 (FIG. 1).

A throttle opening area correcting part 66 corrects the reference throttle opening area Abase based on the desired gauge pressure PBGA_d, the current intake air temperature Ta, and the current atmospheric pressure Pa to determine a throttle opening area A adaptive to the current operating condition of the engine. This correction process is performed by using a correction equation that is derived from the Bernoulli's law as follows:

$$A = A_{base} \times \sqrt{\frac{PBGA_{base}}{|PBGA\_d|} \times \frac{273 + Ta}{273 + Tbase} \times \frac{P_{base}}{Pa}} \quad (4)$$

Here, PBGAbase indicates the reference desired gauge pressure under the above reference condition. Tbase indicates the reference intake air temperature under the reference condition. Pbase indicates the reference atmospheric pressure under the reference condition. As described above, these are 50 mmHg, 25 degrees (° C.) and 760 mmHg, respectively, in this embodiment.

The equation (4) is the correction equation that is derived from the Bernoulli's law. Now, it will be described how to derive the equation (4).

In general, when air flows from a region of a pressure Pa (the atmospheric pressure in this example) into a region of a pressure Pb through a path having a cross sectional area A, the cross sectional area A of the path is expressed in accordance with the Bernoulli's law, as shown by the equation (5).

$$A = \frac{GAIR}{C} \times \frac{1}{\sqrt{2\rho \cdot PBGA}} \quad (5)$$

Here, C indicates a correction coefficient (flow coefficient or discharge coefficient). PBGA indicates a gauge pressure and PBGA=Pa−Pb. GAIR indicates a flow amount of the air. ρ indicates an air density.

Similarly, when air having the flow amount GAIR flows through a path having a cross sectional area Abase under the reference condition of the reference desired gauge pressure PBGAbase, the reference intake air temperature Tbase and the reference atmospheric pressure Pbase, the cross sectional area Abase of the path is expressed as shown by the equation (6).

$$A_{base} = \frac{GAIR}{C} \times \frac{1}{\sqrt{2\rho' \cdot PBGAbase}} \quad (6)$$

Here, ρ' in the equation (6) indicates an air density under this condition.

According to the equation (6), the correction coefficient C is expressed as in the equation (7).

$$C = \frac{GAIR}{A_{base}} \times \frac{1}{\sqrt{2\rho' \cdot PBGAbase}} \quad (7)$$

By substituting the equation (7) into the equation (5), the following equation is obtained.

$$A = \frac{GAIR}{\frac{GAIR}{A_{base}} \times \frac{1}{\sqrt{2\rho' \cdot PBGAbase}}} \times \frac{1}{\sqrt{2\rho \cdot PBGA}} \quad (8)$$

$$= A_{base} \times \sqrt{2\rho' \cdot PBGAbase} \times \frac{1}{\sqrt{2\rho \cdot PBGA}}$$

$$= A_{base} \times \sqrt{\frac{PBGAbase}{PBGA} \times \frac{\rho'}{\rho}}$$

Here, $\rho'/\rho$ is a ratio of the air density, which is expressed as in the equation (9) based on the gas equation of (PV=nRT).

$$\frac{\rho'}{\rho} = \frac{273 + Ta}{273 + Tbase} \times \frac{Pbase}{Pa} \tag{9}$$

By substituting the equation (9) into the equation (8), the equation (4) for determining a throttle opening area A for any desired gauge pressure PBGA_d, intake air temperature Ta and atmospheric pressure Pa is derived.

Figure 4:
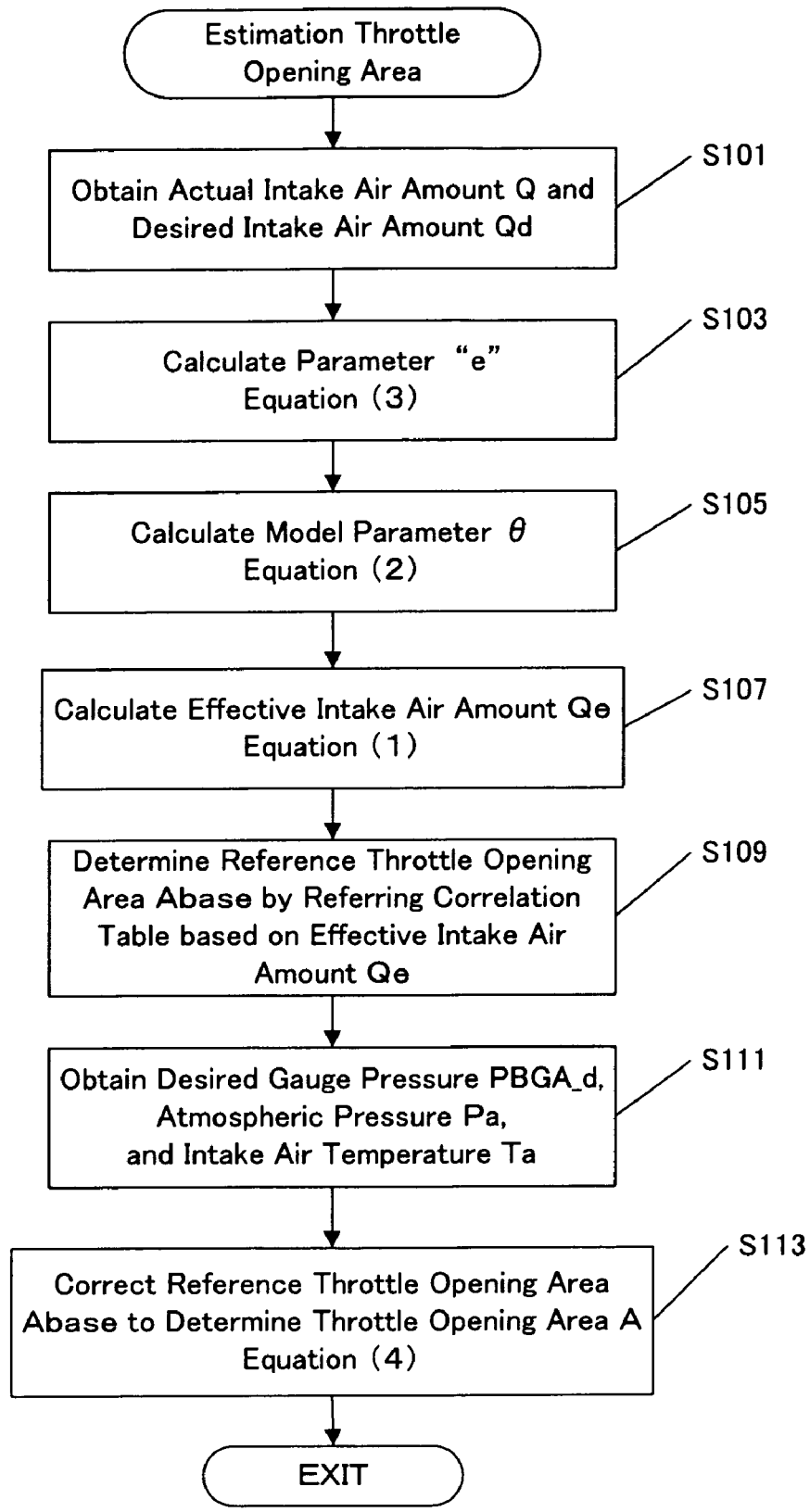
FIG. 4 is a flowchart of a process for estimating a throttle opening area in accordance with one embodiment of the present invention.

FIG. 4 is a flowchart of a process for estimating the throttle opening area A in accordance with one embodiment of the present invention. In one embodiment, the process is carried out by the CPU of the ECU 10, and more specifically carried out by the effective intake air amount determining part 62, the reference throttle opening area determining part 64 and the throttle opening area correcting part 66 shown in FIG. 2. The process may be performed in a predetermined time interval.

In step S101, the desired intake air amount Qd and the actual intake air amount Q are obtained. The desired intake air amount Qd may be determined in accordance with the engine operating condition, and the actual intake air amount Q may be obtained from the detection value of the air flow meter 50. In step S103, the error e is calculated by using the above described equation (3). In step S105, the current value of the model parameter θ is calculated by using the above described equation (2). In step S107, the effective intake air amount Qe is calculated by using the above described equation (1).

In step S109, a correlation table as shown in FIG. 3 is referred to based on the effective intake air amount Qe to determine the reference throttle opening area Abase. In step S111, the desired gauge pressure PBGA_d, the atmospheric pressure Pa and the intake air temperature Ta are obtained. The desired gauge pressure may be determined in accordance with the engine operating condition. The atmospheric pressure Pa and the intake air temperature Ta may be obtained from the detection values of the atmospheric pressure sensor 56 and the intake air temperature sensor 54, respectively.

In step S113, the reference throttle opening area Abase is corrected by using the above described equation (4) to calculate the throttle opening area A used for implementing the desired gauge pressure PBGA_d.

Referring back to FIG. 2, the section acting to perform the feedback control will be described. The feedback correction part 68 determines a correction amount ΔA for the throttle opening area based on the gauge pressure PBGA inside the intake manifold and the desired gauge pressure PBGA_d.

As described above, the throttle opening area A is determined such that it indicates a throttle opening area required for achieving the desired gauge pressure PBGA_d under the condition of the current effective intake air amount Qe, the current atmospheric pressure Pa, the current intake air temperature Ta and so on. However, the correlation table and the correction equation used in this determination are established without considering influence of carbon or the like which may be accumulated in the throttle valve over time. When the accumulation of the carbon increases, the actual throttle opening area may be smaller than the calculated throttle opening area even if the throttle valve is controlled to an opening degree that is determined in accordance with the calculated throttle opening area. As a result, an error may occur between the actual gauge pressure and the desired gauge pressure.

In order to prevent this, considering the influence of disturbance such as the accumulated carbon amount or the like, the feedback control is performed such that the actual gauge pressure PBGA converges to the desired gauge pressure PBGA_d.

Figure 5:
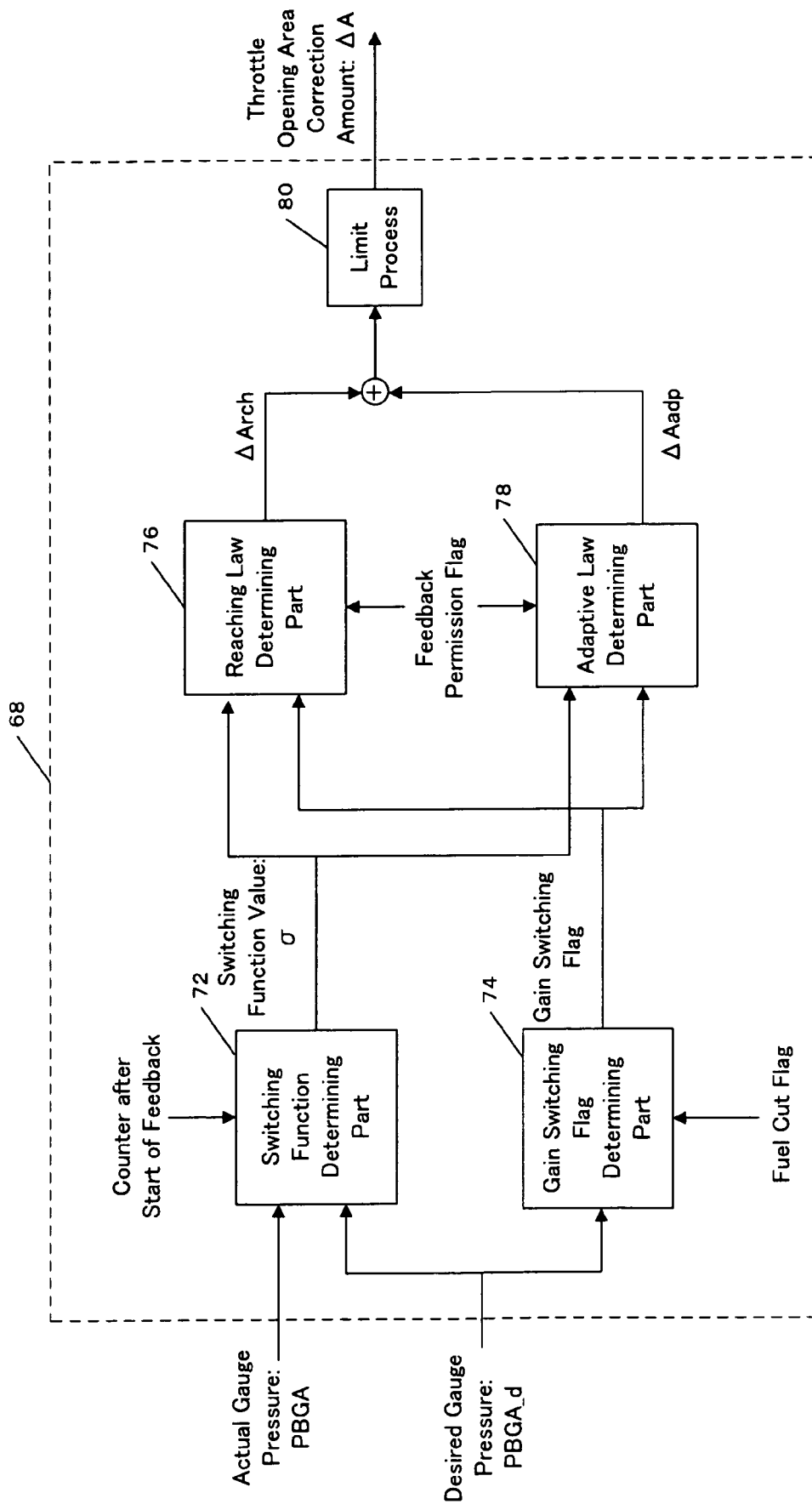
FIG. 5 is a functional block diagram of a feedback correction part in accordance with one embodiment of the present invention.

FIG. 5 shows functional blocks of the feedback correction part 68 in accordance with one embodiment of the invention. The feedback correction part 68 of this embodiment is implemented by a response assignment control that is capable of variably assigning convergence characteristics of a controlled variable to a desired value. In this embodiment, the feedback correction part 68 is implemented by a sliding mode controller which is one scheme of the response assignment control.

Alternatively, the feedback correction part 68 may be configured to implement another response assignment control (e.g., a back-stepping control) or may be configured to implement another feedback control such as a PID controller.

The desired gauge pressure PBGA_d and the actual gauge pressure PBGA are input into the feedback correction part 68. The actual gauge pressure PBGA is a difference between the atmospheric pressure Pa measured by the atmospheric pressure sensor 56 and the pressure Pb in the intake manifold measured by the intake manifold pressure sensor 52.

Based on the desired gauge pressure PBGA_d and the actual gauge pressure PBGA, a switching function determining part 72 determines a switching function value σ by using a switching function that specifies a convergence behavior of an error between the actual and desired pressures.

More specifically, the error E between the actual gauge pressure PBGA and the desired gauge pressure PBGA_d is calculated as indicated by the equation (10).

$$E = PBGA - PBGA\_d \tag{10}$$

Then, the switching function value σ is calculated by using the switching function as shown by the equation (11).

$$\sigma = E(\text{current value}) + pole \times E(\text{previous value}) \tag{11}$$

Here, "pole" is a parameter for specifying a convergence speed of the error E. In one embodiment, the parameter pole may be set in accordance with a counter after a start of the feedback. For example, the convergence speed of the error E may be gradually increased by making the value of the parameter pole greater with the elapsed time since the feedback control was started.

The calculated switching function value σ is sent to a reaching law determining part 76 and an adaptive law determining part 78.

A gain switching flag determining part 74 determines whether or not a gain switching flag is to be set. The gain switching flag is a flag for decreasing a feedback gain when a predetermined condition is met. In one embodiment, the gain switching flag is set when the engine load is low, when a fuel cut is being performed, when the desired gauge pressure is low, or when a variation in the desired gauge pressure is large.

In this regard, the condition of "when a fuel cut is being performed" is determined by monitoring a fuel cut flag that is to be set during the fuel cut operation. The conditions of "when the desired gauge pressure is low" and "when a variation in the desired gauge pressure is large" are determined by the desired gauge pressure and its variation amount. The condition of "when the engine load is low" is determined based on the engine rotational speed and the desired intake air amount.

The gain switching flag is sent to the reaching law determining part 76 and the adaptive law determining part 78.

The reaching law determining part 76 refers to a predetermined table to determine a proportional term ΔArch of the feedback control corresponding to the switching function value σ. Two types of the tables are prepared and stored in the memory 10c of the ECU10. One type is used for normal operation and the other type is used when the gain switching flag is set. One of the tables is selected in accordance with whether the gain switching flag has been set. Values of the proportional term ΔArch of the feedback control defined in the table used when the gain switching flag is set are smaller than those defined in the table prepared for the normal operation.

Further, the reaching law determining part 76 is configured to determine the proportional term ΔArch when a feedback permission flag is set. More specifically, when the throttle valve is fully opened and hence the gauge pressure is almost zero, when the intake air amount control is prohibited by the variable valve actuation mechanism and hence the lift amount of the intake valve is fixed, or when the engine starts, the feedback permission flag is not set. In these conditions, the reaching law determining part 76 outputs the value of zero.

Alternatively, a feedback gain may be predetermined. The reaching law determining part 76 may calculate the proportional term ΔArch by multiplying the switching function value σ by the predetermined feedback gain. In this case, when the above feedback permission flag is not set, the feedback gain is changed to zero, so that the proportional term ΔArch outputted from the reaching law determining part 76 is zero.

The adaptive law determining part 78 refers to a predetermined table to determine an integral term ΔAadp of the feedback control corresponding to the switching function value σ. Two types of the tables are prepared and stored in the memory 10c of the ECU10. One type is used for normal operation and the other type is used when the gain switching flag is set. One of the tables is selected in accordance with whether the gain switching flag has been set. Values of the integral term ΔAadp of the feedback control defined in the table used when the gain switching flag is set are smaller than those defined in the table prepared for the normal operation.

Further, the adaptive law determining part 78 is preferably configured to determine the integral term ΔAadp when the feedback permission flag is set. More specifically, when the throttle valve is fully opened and hence the gauge pressure is almost zero, when the intake air amount control is prohibited by the variable valve actuation mechanism and hence the lift amount of the intake valve is fixed, or when the engine starts, the feedback permission flag is not set. In these conditions, the adaptive law determining part 78 outputs the value of zero.

Alternatively, a feedback gain may be predetermined. The adaptive law determining part 78 may calculate the integral term ΔArch by multiplying the switching function value σ by the predetermined feedback gain. In this case, when the above feedback permission flag is not set, the feedback gain is changed to zero, so that the integral term ΔAadp outputted from the adaptive law determining part 78 is zero.

The proportional term ΔArch from the reaching law determining part 76 and the integral term ΔAadp from the adaptive law determining part 78 are added. A predetermined limit process 80 is performed on the value obtained by the above addition and then the resultant value is outputted as a correction amount ΔA for the throttle opening area.

Referring back to FIG. 2, subsequent processes will be described. The throttle opening area A from the opening area correcting part 66 and the correction amount ΔA for the throttle opening area from the feedback correction unit 68 are added. The resultant value is inputted into a throttle opening degree determining part 70.

Figure 6:
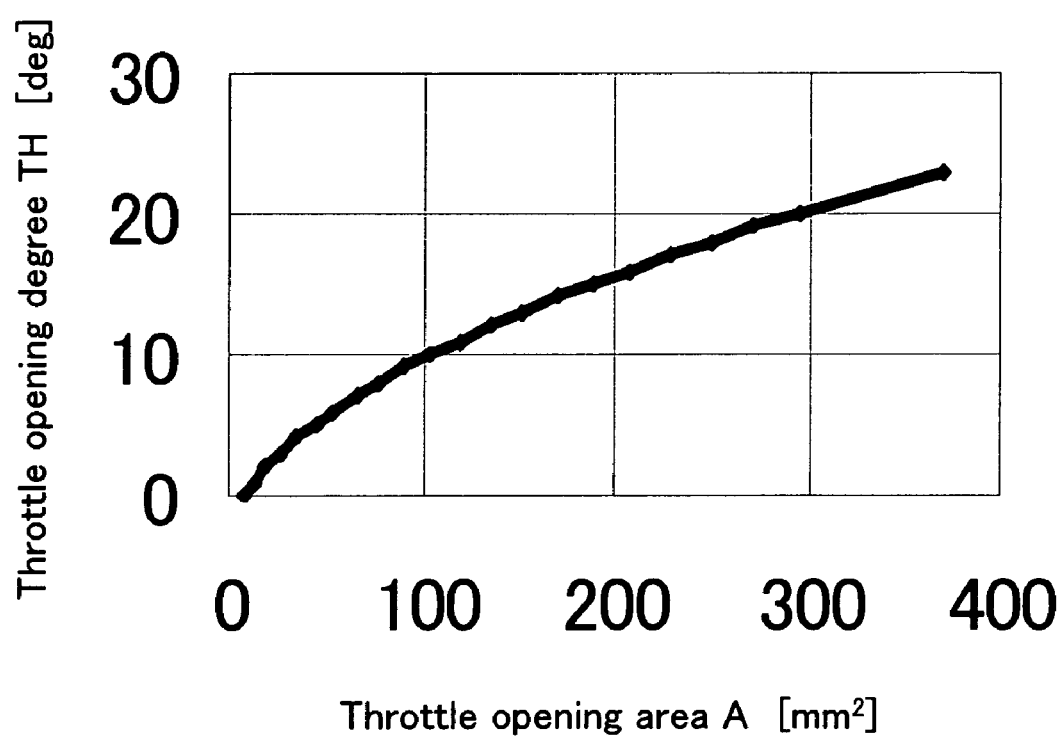
FIG. 6 is a table defining a relation between a throttle opening area and a throttle opening degree in accordance with one embodiment of the present invention.

The throttle opening degree determining part 70 refers to a predetermined table to determine an opening degree TH of the throttle valve corresponding to the throttle opening area A+ΔA. FIG. 6 shows an example of such a table. The table can be created by examining, through simulation in advance, a relation between the throttle opening area and the throttle opening degree. The table may be stored in the memory 10c of the ECU 10.

The intake air controlling apparatus 10 performs the constant negative pressure control by controlling the throttle valve 46 (FIG. 1) in accordance with the throttle opening degree TH thus determined.

Next, a process for determining an abnormality of an intake air system in accordance with one embodiment of the invention will be described.

Referring to FIG. 2, an abnormality determining part 71 makes an abnormality determination of the intake air system based on the throttle opening area correction amount ΔA from the feedback correction part 68 and an air-fuel ratio correction amount KAF determined by an air-fuel ratio controlling part 69. Further, when an abnormality is detected, the abnormality determining part 71 identifies where the abnormality has occurred in accordance with a determination flow that will be described later referring to FIG. 7.

Here, the air-fuel ratio controlling part 69 determines the air-fuel ratio correction amount KAF such that an error between a current air-fuel ratio measured by the LAF sensor 60 (FIG. 1) and a desired air-fuel ratio that is determined in accordance with the current operating condition of the engine is eliminated. The air-fuel ratio correction amount KAF may be calculated by using a conventional feedback control such as a PID control. The air-fuel ratio controlling part 69 adjusts a fuel injection amount to control the air-fuel ratio by, for example, changing valve-opening time of the fuel injection valve 22 in accordance with the calculated correction amount KAF.

Figure 7:
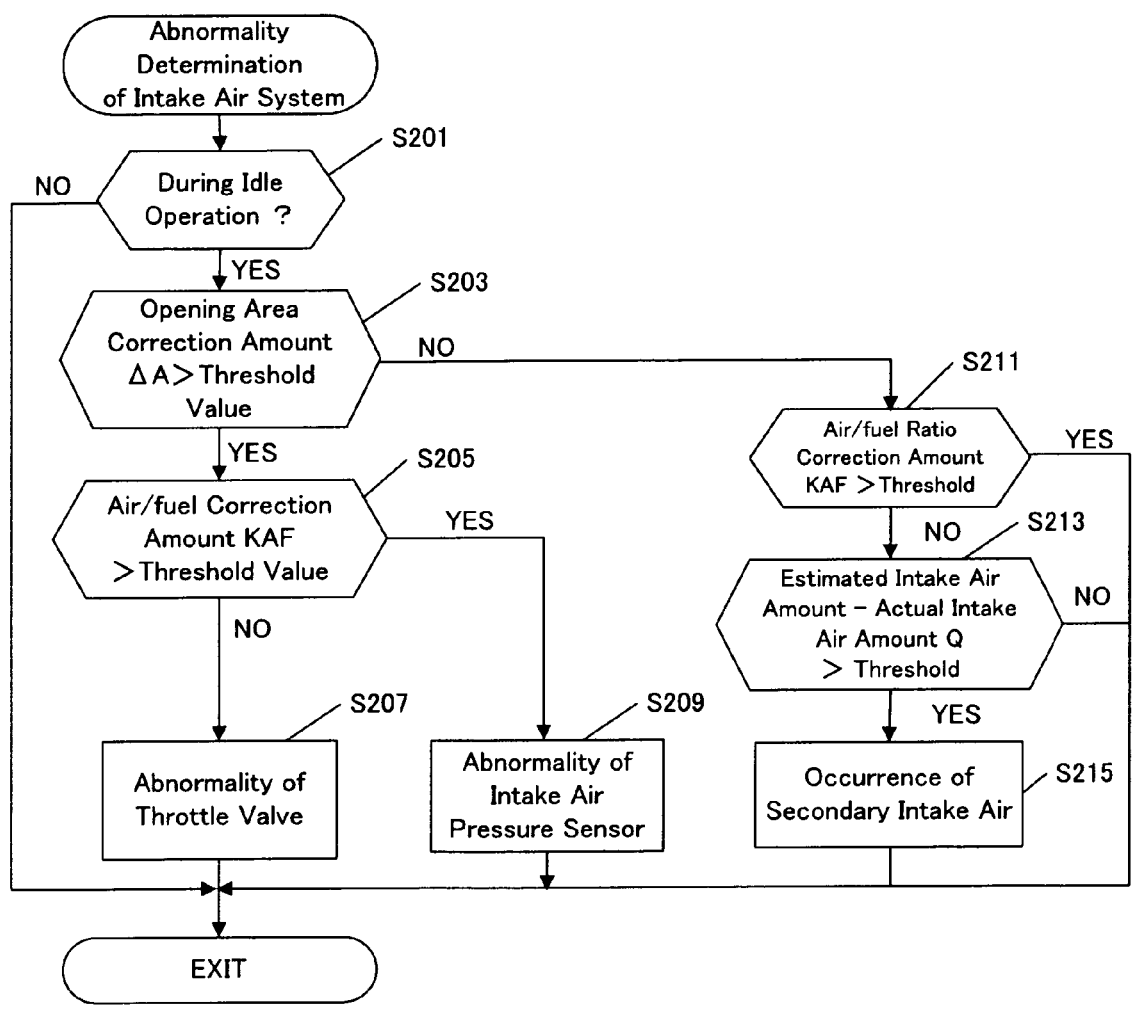
FIG. 7 is a flowchart of a process for determining an abnormality in an intake air system in accordance with one embodiment of the present invention.

FIG. 7 is a flowchart of a process for determining an abnormality of the intake air system. In one embodiment, the process is carried out by the CPU of the ECU 10, and more specifically carried out by the abnormality determining part 71. The process may be performed in a predetermined time interval.

In step S201, it is determined whether the engine is in an idling condition in which the lift amount of the intake valve is controlled such that the engine rotational speed converges to a desired value for maintaining the idling condition. When the engine is in the idling condition, the process proceeds to step S203. Otherwise, the process exits.

In step S203, it is determined whether the throttle opening area correction amount ΔA is greater than a predetermined first threshold value. If ΔA is greater than the first threshold value, it can be determined that carbon with a volume greater than an allowable amount is accumulated around the throttle valve or there is a probability that a characteristic abnormality occurs in the throttle opening sensor 48, and the process proceeds to step S205. If ΔA is equal to or less than the first threshold value, the process proceeds to step S211.

In step S205, it is determined whether the air-fuel ratio correction amount KAF is greater than a predetermined second threshold value.

If KAF is equal to or less than the second threshold value, it can be determined that an abnormality regarding the throttle valve, such as a carbon clogging around the throttle valve or a characteristic abnormality of the throttle opening sensor 48, has occurred (step S207) and then the process exits.

If KAF is greater than the second threshold value, the feedback correction amounts for both the constant negative pressure control and the air-fuel ratio control are greater than allowable values. Thus, it can be determined that an abnormality has occurred in both the constant negative pressure control and the air-fuel control. In the air-fuel ratio control, the fuel injection amount is determined based on an estimated intake air amount GAIR. The estimated intake air amount is determined by referring to a map (table) based on the engine rotational speed NE, the pressure Pb inside the intake manifold and the like. That is, the intake manifold pressure sensor 52, among various components included in the intake air system, is involved with both the constant negative pressure control and the air-fuel ratio control. Therefore, if KAF is greater than the second threshold value, it is determined that an abnormality has occurred in the intake manifold pressure sensor 52 (step S209), and then the process exits.

If the throttle opening area correction amount ΔA is equal to or less than the predetermined first threshold value (when the decision in step S203 is "no") and KAF is equal to or less than the predetermined second threshold value in step S211, the process proceeds to step S213. If KAF is greater than the second threshold value in step S211, the process exits.

In step S213, the estimated intake air amount GAIR is determined by, for example, referring to a map (table) based on the engine rotational speed NE, the pressure Pb inside the intake manifold, the lift amount of the intake valve 14 and the like.

Then, an error between the estimated intake air amount GAIR and the actual intake air amount Q measured by the air flow meter 50 is calculated. It is determined whether the error is greater than a predetermined threshold value (S213).

If the error is greater than the predetermined threshold value, it is determined in step S215 that a secondary air leak has occurred downstream of the air flow meter 50 in the intake manifold because the amount of air flowing into the intake manifold is greater than the amount of air (that is, actual intake air amount Q) passing through the throttle valve. If the error is equal to or less than the predetermined threshold value, the process exits.

Thus, according to the present invention, in the engine where the intake air amount is controlled by the variable valve actuation mechanism 40 and the constant negative pressure is controlled by the throttle valve 46, it can be determined where an abnormality occurs in the intake air system with higher accuracy by an abnormality determination utilizing a combination of the throttle opening area correction amount ΔA and the air-fuel ratio correction amount KAF.

In the invention, an abnormality of the intake manifold pressure sensor 52 is more accurately determined when the magnitude of the correction amount KAF, which is used during the air-fuel ratio feedback control using the LAF sensor 60, is determined to be abnormal. Thus, a prompt and low-cost action can be taken when the intake manifold pressure sensor 52 is faulty.

In the invention, when the intake air amount control deteriorates and hence idling stability and/or traveling capability deteriorate, occurrence of a throttle abnormality and/or an occurrence of a secondary air can be more accurately determined. Therefore, an action in response to such abnormalities can be taken promptly and inexpensively.

In one embodiment of the invention, the above described determination of an abnormality of an intake air system is implemented in a computer program embodied on a computer readable medium.

Although the present invention has been described above referring to the specific embodiments, the present invention should not be limited to such embodiments, and the present invention can be changed or modified without departing from the scope of the invention.

What is claimed is:

1. An apparatus for determining an abnormality of an intake air system of an internal-combustion engine having a variable valve actuation mechanism for continuously adjusting at least a lift amount of an intake valve to control an intake air amount and a throttle valve for keeping a gauge pressure in an intake manifold at a predetermined desired gauge pressure, the apparatus comprising:

means for determining a throttle opening area based on a current intake air amount;

means for performing a feedback correction on the throttle opening area, the feedback correction including determining a correction amount of the throttle opening area such that the gauge pressure in the intake manifold converges to the desired gauge pressure and adding the correction amount to the throttle opening area;

means for performing a feedback control for an air-fuel ratio, the feedback control including determining a correction amount of the air-fuel ratio based on a detection value of an air-fuel ratio detecting means that is provided in an exhaust manifold; and means for determining an abnormality of the intake air system during an idling operation based on the correction amount of the throttle opening area and the correction amount of the air-fuel ratio.

2. The apparatus of claim 1, wherein the means for determining an abnormality determines that there is an abnormality in the throttle valve when the correction amount of the throttle opening area is greater than a first determination value and the correction amount of the air-fuel ratio is equal to or less than a second determination value.

3. The apparatus of claim 1, wherein the means for determining an abnormality determines that there is an abnormality in a measuring means for measuring a pressure inside the intake manifold when the correction amount of the throttle opening area is greater than a first determination value and the correction amount of the air-fuel ratio is greater than a second determination value.

4. The apparatus of claim 1, wherein the means for determining an abnormality determines that secondary intake air occurs when the following conditions are met: 1) the correction amount of the throttle opening area is equal to or less than a first determination value; 2) the correction amount of the air-fuel ratio is equal to or less than a second determination value; and 3) an error between an estimated intake air amount and an actual intake air amount is greater than a third determination value, the estimated intake air amount being derived from an engine rotational speed, an intake manifold pressure and the lift amount, the actual intake air amount being detected by an intake air amount detecting means.

5. A method for determining an abnormality of an intake air system of an internal-combustion engine having a variable valve actuation mechanism for continuously adjusting at least a lift amount of an intake valve to control an intake air amount and a throttle valve for keeping a gauge pressure in an intake manifold at a predetermined desired gauge pressure, the method comprising:

determining a throttle opening area based on a current intake air amount;

performing a feedback correction on the throttle opening area, the feedback correction including determining a correction amount of the throttle opening area such that the gauge pressure in the intake manifold converges to the desired gauge pressure and adding the correction amount to the throttle opening area;

performing a feedback control for an air-fuel ratio, the feedback control including determining a correction amount of the air-fuel ratio based on a detection value of an air-fuel ratio detecting means that is provided in an exhaust manifold; and determining an abnormality of the intake air system during an idling operation based on the correction amount of the throttle opening area and the correction amount of the air-fuel ratio.

6. The method of claim 5, wherein the step of determining an abnormality includes determining that there is an abnormality in the throttle valve when the correction amount of the throttle opening area is greater than a first determination value and the correction amount of the air-fuel ratio is equal to or less than a second determination value.

7. The method of claim 5, wherein the step of determining an abnormality includes determining that there is an abnormality in a measuring means for measuring a pressure inside the intake manifold when the correction amount of the throttle opening area is greater than a first determination value and the correction amount of the air-fuel ratio is greater than a second determination value.

8. The method of claim 5, wherein the step of determining an abnormality includes determining that secondary intake air occurs when the following conditions are met; 1) the correction amount of the throttle opening area is equal to or less than a first determination value; 2) the correction amount of the air-fuel ratio is equal to or less than a second determination value; and 3) an error between an estimated intake air amount and an actual intake air amount is greater than a third determination value, the estimated intake air amount being derived from an engine rotational speed, an intake manifold pressure and the lift amount, the actual intake air amount being detected by an intake air amount detecting means.

9. A computer program embodied on a computer readable medium for causing a computer to determine an abnormality of an intake air system of an internal-combustion engine having a variable valve actuation mechanism for continuously adjusting at least a lift amount of an intake valve to control an intake air amount and a throttle valve for keeping a gauge pressure in an intake manifold at a predetermined desired gauge pressure, comprising the steps of:

determining a throttle opening area based on a current intake air amount;

performing a feedback correction on the throttle opening area, the feedback correction including determining a correction amount of the throttle opening area such that the gauge pressure in the intake manifold converges to the desired gauge pressure and adding the correction amount to the throttle opening area;

performing a feedback control for an air-fuel ratio, the feedback control including determining a correction amount of the air-fuel ratio based on a detection value of an air-fuel ratio detecting means that is provided in an exhaust manifold; and determining an abnormality of the intake air system during an idling operation based on the correction amount of the throttle opening area and the correction amount of the air-fuel ratio.

10. The computer program of claim 9, wherein the step of determining an abnormality includes determining that there is an abnormality in the throttle valve when the correction amount of the throttle opening area is greater than a first determination value and the correction amount of the air-fuel ratio is equal to or less than a second determination value.

11. The computer program of claim 9, wherein the step of determining an abnormality includes determining that there is an abnormality in a measuring means for measuring a pressure inside the intake manifold when the correction amount of the throttle opening area is greater than a first determination value and the correction amount of the air-fuel ratio is greater than a second determination value.

12. The computer program of claim 9, wherein the step of determining an abnormality includes determining that secondary intake air occurs when the following conditions are met; 1) the correction amount of the throttle opening area is equal to or less than a first determination value; 2) the correction amount of the air-fuel ratio is equal to or less than a second determination value; and 3) an error between an estimated intake air amount and an actual intake air amount is greater than a third determination value, the estimated intake air amount being derived from an engine rotational speed, an intake manifold pressure and the lift amount, the actual intake air amount being detected by an intake air amount detecting means.

* * * * *